(12) United States Patent
Shu et al.

(10) Patent No.: US 9,857,036 B1
(45) Date of Patent: Jan. 2, 2018

(54) ROBOT SERVO CAPABLE OF EMITTING LIGHT

(71) Applicant: UBTECH Robotics Corp., Shenzhen (CN)

(72) Inventors: Wenquan Shu, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 0 days.

(21) Appl. No.: 15/347,834

(22) Filed: Nov. 10, 2016

(30) Foreign Application Priority Data

Aug. 12, 2016 (CN) .......................... 2016 1 0665976

(51) Int. Cl.
| | |
|---|---|
| *F21V 7/04* | (2006.01) |
| *G02B 6/00* | (2006.01) |
| *G09F 13/00* | (2006.01) |
| *F21K 9/61* | (2016.01) |
| *F21V 8/00* | (2006.01) |
| *F21V 11/16* | (2006.01) |
| *B25J 9/12* | (2006.01) |
| *F21Y 115/10* | (2016.01) |
| *H02K 11/33* | (2016.01) |
| *H02K 11/20* | (2016.01) |
| *H02K 7/116* | (2006.01) |

(52) U.S. Cl.
CPC .................. *F21K 9/61* (2016.08); *B25J 9/12* (2013.01); *F21V 11/16* (2013.01); *G02B 6/0008* (2013.01); *F21Y 2115/10* (2016.08); *H02K 7/116* (2013.01); *H02K 11/20* (2016.01); *H02K 11/33* (2016.01)

(58) Field of Classification Search
USPC ................ 369/121, 116, 13.24, 13.27, 13.28
See application file for complete search history.

(56) References Cited

U.S. PATENT DOCUMENTS

| | | | | |
|---|---|---|---|---|
| 5,157,249 | A * | 10/1992 | Hashimoto .......... | G11B 7/0912 250/201.5 |
| 2009/0207604 | A1* | 8/2009 | Robotham .............. | F21S 10/02 362/230 |
| 2016/0169497 | A1* | 6/2016 | Kratochvil ............ | F21S 48/321 362/547 |

\* cited by examiner

*Primary Examiner* — Ashok Patel

(57) ABSTRACT

A servo includes a servo casing, a servo cover connected to the servo casing, a circuit board, a light emitting member, and a light guide. The servo cover and the servo casing defines a receiving space. The circuit board is received in the receiving space. The light emitting member is arranged on the circuit board and electrically coupled to the circuit board. The light emitting member is capable of emitting light according to signals indicative of a motion state from the circuit board. The light guide includes a light incident surface that is located adjacent to the light emitting member, and a light exit surface that is exposed to an external surface of the servo cover.

10 Claims, 2 Drawing Sheets

ROBOT SERVO CAPABLE OF EMITTING LIGHT

CROSS REFERENCE TO RELATED APPLICATIONS

This application claims priority to Chinese Patent Application No. 201610665976.X, filed Aug. 12, 2016, which is hereby incorporated by reference herein as if set forth in its entirety.

BACKGROUND

1. Technical Field

The present disclosure generally relates to robots, and particularly to a servo that is capable of emitting light for ease of identification of a motion state.

2. Description of Related Art

Servos are one of the key components for the motion of robots, and are generally mounted in the joint supports of robots for performing motions of the robot joints. Some conventional servos are limited in structure and functionality, and can only realize the rotation of the robot joints. The motion state during the motion of the robots cannot be easily identified.

SUMMARY

A servo includes a servo casing, a servo cover connected to the servo casing, a circuit board, a light emitting member, and a light guide. The servo cover and the servo casing defines a receiving space. The circuit board is received in the receiving space. The light emitting member is arranged on the circuit board and electrically coupled to the circuit board. The light emitting member is capable of emitting light according to signals indicative of a motion state from the circuit board. The light guide includes a light incident surface that is located adjacent to the light emitting member, and a light exit surface that is exposed to an external surface of the servo cover.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
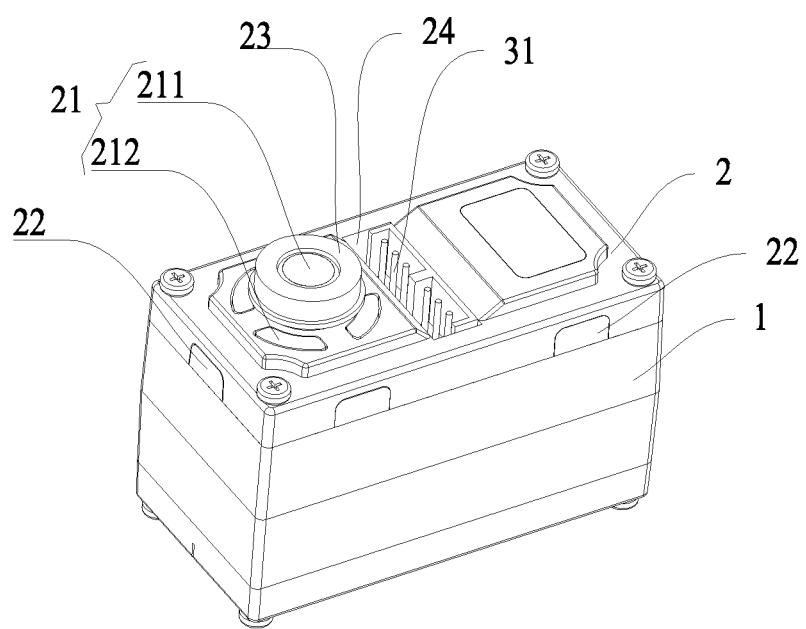
FIG. 1 is an isometric view of a servo according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
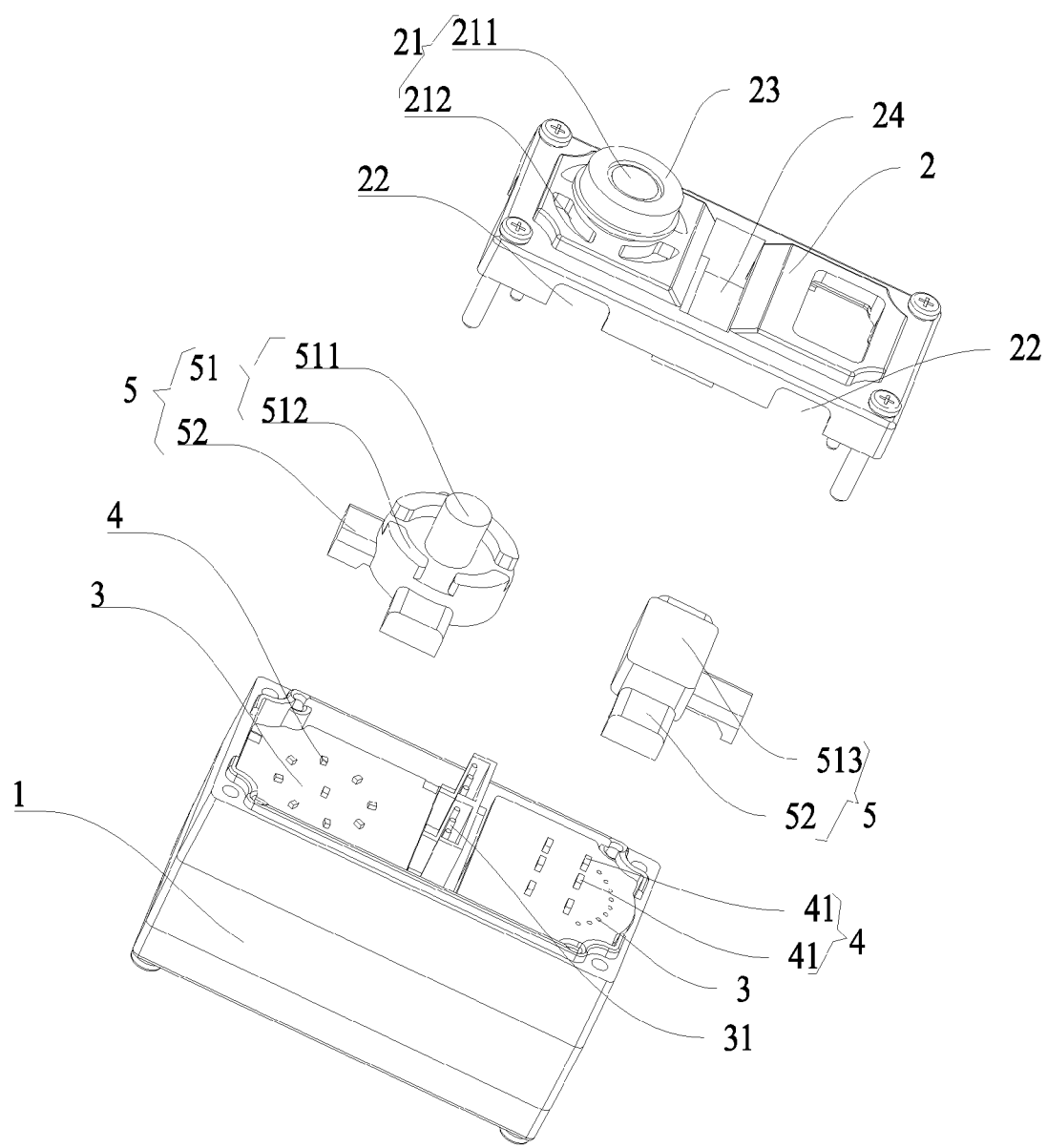
FIG. 2 is an exploded isometric view of the servo of FIG. 1.

FIGS. 1 and 2 show a servo according to one embodiment. The servo is mounted in a robot for controlling the motion of the robot. Specifically, the servo includes a servo casing 1, a servo cover 2, a circuit board 3, a light emitting member 4 and a light guide 5. The servo casing 1 and the servo cover 2 are connected to each other and define corporately a receiving space. The circuit board 3 is received in the receiving space. The circuit board 3 may be fixed to the servo casing 1. The light emitting member 4 is arranged on and electrically coupled to the circuit board 3. The light emitting member 4 is capable of emitting light according to signals indicative of a motion state from the circuit board. The light guide 5 includes a light incident surface that is located adjacent to the light emitting member 4, and a light exit surface that is exposed to an external surface of the servo cover 2, thereby allowing the light from the light emitting member 4 to be uniform and scatter in a specific direction. In the embodiment, the light exit surface of the light guide 5 is a matte surface which can make the light passing through the light guide 5 to be more uniform. When the servo is operating, the circuit board 3 controls the light emitting member 4 to emit light, and the light passes through the light guide 5 and travels outside the servo casing 1. A user can then identify the motion state of the servo according to the light from the external surface of the servo cover 2. The light coming out of the servo casing 1 makes the appearance of the servo more appealing.

In the embodiment, the light emitting member 4 includes plural light-emitting diodes (LEDs) 41 that emit light of different colors when powered up. The LEDs 41 may be controlled to emit light of different colors according to different motion states, such as red light, yellow light, blue light, green light, white light, pink light and purple light, allowing a user to identify a motion state of the servo according to the light of different color, and making the robot including the servo beautiful and appealing during operation.

In the embodiment, the number of the light emitting member 4 may be one or two and arranged in one or different circuit boards 3. Each light emitting member 4 is provided with a corresponding a light guide 5 that allows the light from the light emitting member 4 to be uniform and scatter in a specific direction, and allows a user to identify a motion state of the servo according to light emitting angle of the light guide.

The light guide 5 includes a main body 51 and at least one side light guide 52 protruding from a side surface of the main body 51. The main body 51 and the side light guide 52 each include a light exit surface at an end. The servo cover 2 defines a main light guide hole 21 matching the main body 51 and allowing the main body 51 to fit therein, and a side light guide hole 22 matching the side light guide 52 and allowing the sides light guide 52 to fit therein. That is, the light exit surface at the end of the main body 51 is received in the main light guide hole 21. The light exit surface at the end of the side light guide 52 is received in the main light guide hole 22. The light exit surface at the end of the main body 51 matches the main light guide hole 21 in size and shape. The light exit surface at the end of the side light guide 52 matches the side light guide hole 22 in size and shape.

In the embodiment, the light guide 5 includes three side light guides 52 that are respectively arranged on three side surfaces of the main body 51 and form corporately a T shaped configuration. The servo cover 2 is about rectangular and includes side surfaces that are perpendicular to each other. Three side surfaces of the servo cover 2 each define a side light guide hole 22 matching one side light guide 52. The main light guide hole 21 is defined in the top surface of the servo cover 2, and the side light guide holes 22 are defined in a front side surface, a rear side surface and a left side surface or a right side surface. The light exit surface of each side light guide 52 in the side light guide hole 22 may be circular, rectangular, rectangular with round chamfers or oval. Since the light exit surfaces match the side light guide holes 22 in size and shape, the side light guide holes 22 may be circular, rectangular, rectangular with round chamfers or oval.

In the embodiment, since the light guide 5 includes a main body 51 and a side light guide 52 protruding from each of the front side surface, a left side surface and a rear side surface of main body 51, the front side surface, left side surface and rear side surface of the servo cover 2 each define a side light guide hole 22 matching a corresponding side light guide 52. The ends of the three light guides 52 are respectively received in the three side light guide holes 22, which can prevent the light guide 5 from moving in the space defined by the servo casing 1 and the servo cover 2.

In the embodiment, the light guide 5 includes a first light guide 511 and a plurality of second light guides 512 surrounding the first light guide 511, and the second light guides 512 are evenly arranged around the first light guide 511. The first light guide 511 is cylindrical, and four arc-shaped second light guides 512 are evenly arranged along a ring centered on the first light guide 511. Correspondingly, the main light guide hole 21 of the servo cover 2 defines a first light guide hole 211 that receives the first light guide 511 and matches the light guide 511 in size and shape, and a plurality of second light guide holes 212 each of which receives one second light guide 512 and matches the light guide 512 in size and shape. In the embodiment, the servo includes two light guides 5 and the two light guides 5 have the same structure for ease of mass production and reducing cost.

In another embodiment, the main body 51 may include a third light guide 513 that may be cuboid or cylindrical. The light exit surface of the third light guide 513 in the main light guide hole 21 may be rectangular, square or circular. The main light guide hole 21 match the light exit surface of the third light guide 513 in size and shape. In the embodiment, the main bodies 51 of the two light guides 5 have the same structure for ease of mass production and reducing cost.

In yet another embodiment, the main bodies 51 of the two light guides 5 have different structures. As shown in FIG. 2, one main body 51 includes a first light guide 511 and a plurality of second light guides 512 surrounding the first light guide 511, and the second light guides 512 are evenly arranged around the first light guide 511. The first light guide 511 is cylindrical, and four arc-shaped second light guides 512 are evenly arranged along a ring centered on the first light guide 511. Correspondingly, the main light guide hole 21 of the servo cover 2 includes a first light guide hole 211 that receives the first light guide 511 and matches the light guide 511 in size and shape, and a plurality of second light guide holes 212 each of which receives one second light guide 512 and matches the light guide 512 in size and shape. The other main body 51 includes a third light guide 513 that may be cuboid or cylindrical. The light exit surface of the third light guide 513 in the main light guide hole 21 may be rectangular, square or circular. The main light guide hole 21 match the light exit surface of the third light guide 513 in size and shape. With the two main bodies 51 of different structures, it is easy to distinguish the two light guides 5 from each other according to the shape of the light exit surfaces in the main light guide holes 21, which facilitates the identification of the motion state of the servo.

The light guide 5 is made of transparent material and may be constructed in any suitable shape. The servo casing 1 and the servo cover 2 each include a blocking portion made of opaque material for preventing light from the light emitting member to pass therethrough. Because of the blocking portion, the light from the light emitting member can only spread out from the light exit surfaces of the light guide 5 in the main light guide hole 21 or the side light guide holes 22, which causes the light from light emitting member 4 to scatter in a specific direction, and makes it easy for a user identify a motion state of the servo according to light emitting angle of the light exit surfaces.

In the embodiment, the servo includes an electric motor, a circuit board, a speed reduction gear set, an output shaft and a sensor. The electric motor, the speed reduction gear set and the sensor are arranged in the receiving space defined by the servo cover 2 and the servo casing 1. The servo cover 2 is located at a side opposite to an output shaft of the servo, and includes a support 23 that is coaxial with the output shaft. The support 23 is hollow. The main light guide 21 is defined in the center of the top surface of the support 23. When the servo is used in a robot joint, the output shaft and the support 23 can serves as a rotational shaft which a connection member for constructing a frame of the robot can rotate together with, which facilitates the assembling of the robot. The circuit board 3 includes an input/output interface 31, and the servo cover 2 defines a mounting hole 24 matching the input/output interface 31. The mounting hole 24 is arranged between the two main light guide holes 21 corresponding to the two main bodies 51.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo comprising:
   a servo casing;
   a servo cover connected to the servo casing, the servo cover and the servo casing defining a receiving space;
   a circuit board received in the receiving space;
   a light emitting member arranged on the circuit board and electrically coupled to the circuit board, the light emitting member being configured to emit light according to signals indicative of a motion state from the circuit board; and
   a light guide comprising a light incident surface that is located adjacent to the light emitting member, and a light exit surface that is exposed to an external surface of the servo cover.

2. The servo of claim 1, wherein light guide comprises a main body and at least one side light guide protruding from a side surface of the main body, the main body and the side light guide comprise the light exit surface at ends thereof, and the servo cover defines a main light hole matching the main body and a side light guide hole matching the side light guide.

3. The servo of claim 2, wherein the servo cover is located at a side opposite to an output shaft of the servo, the servo cover comprises a cylindrical support that is coaxial with the output shaft, and the main light guide hole is defined in a center of a top surface of the support.

4. The servo of claim 3, wherein the circuit board comprises an input/output interface, and the servo cover defines a mounting hole matching the input/output interface.

5. The servo of claim 4, wherein the light guide comprises three side light guides, and the three side light guides are located on side surfaces of the main body and form corporately a T shaped configuration.

6. The servo of claim 5, wherein the main body comprise a first light guide and a plurality of second light guides surrounding the first light guide, and the second light guides are evenly arranged around the first light guide.

7. The servo of claim 6, wherein the first light guide is cylindrical, and four arc-shaped second light guides are evenly arranged along a ring centered on the first light guide.

8. The servo of claim 1, wherein the light emitting member comprises a plurality of light-emitting diodes that emit light of different colors when powered up.

9. The servo of claim 8, wherein the light exit surface of the light guide is a matte surface.

10. The servo of claim 9, wherein the servo cover and the servo casing each comprise a blocking portion made of opaque material for preventing light from the light emitting member to pass therethrough.

* * * * *